United States Patent
Hu et al.

(10) Patent No.: US 6,789,390 B2
(45) Date of Patent: Sep. 14, 2004

(54) METHODS AND APPARATUS FOR ESTIMATING GAS TURBINE ENGINE GOVERNOR DYNAMICS

(75) Inventors: John Z. Hu, Niskayuna, NY (US); Daniel R. Gilmore, Jr., Danvers, MA (US)

(73) Assignee: General Electric Company, Schenectady, NY (US)

( * ) Notice: Subject to any disclaimer, the term of this patent is extended or adjusted under 35 U.S.C. 154(b) by 70 days.

(21) Appl. No.: 10/251,266

(22) Filed: Sep. 20, 2002

(65) Prior Publication Data

US 2004/0059470 A1 Mar. 25, 2004

(51) Int. Cl.[7] .............................................. F02C 9/00
(52) U.S. Cl. ................................... 60/773; 60/39.281
(58) Field of Search .............................. 60/773, 39.281

(56) References Cited

U.S. PATENT DOCUMENTS

| | | | | |
|---|---|---|---|---|
| 3,644,815 A | * | 2/1972 | Falk ............................ 318/609 |
| 5,134,845 A | * | 8/1992 | Romano ...................... 60/39.281 |
| 5,440,490 A | * | 8/1995 | Summerfield ............... 701/100 |
| 5,487,265 A | * | 1/1996 | Rajamani et al. .............. 60/773 |
| 5,724,242 A | | 3/1998 | Moore-McKee et al. | |
| 6,133,643 A | * | 10/2000 | Lukich et al. ............. 290/40 A |
| 6,269,300 B1 | | 7/2001 | Moore-McKee et al. | |
| 6,564,774 B2 | * | 5/2003 | Ellims et al. ................ 123/352 |

* cited by examiner

*Primary Examiner*—Justine R Yu
*Assistant Examiner*—William H. Rodriguez
(74) *Attorney, Agent, or Firm*—William Scott Andes; Armstrong Teasdale LLP (57) ABSTRACT

An apparatus estimates governor dynamics for a gas turbine engine used in a system. The apparatus is programmed to obtain a first set of parameters from a governing sub-system coupled to the system, obtain a second set of parameters from the governing sub-system, and generate governor dynamics estimates by utilizing the first and second sets of parameter outputs to solve a multiple objective optimization algorithm problem.

13 Claims, 5 Drawing Sheets

METHODS AND APPARATUS FOR ESTIMATING GAS TURBINE ENGINE GOVERNOR DYNAMICS

BACKGROUND OF THE INVENTION

This invention relates generally to control systems for gas turbine engines, and, more particularly, to methods and apparatus for estimating governor dynamics.

Figure 1:
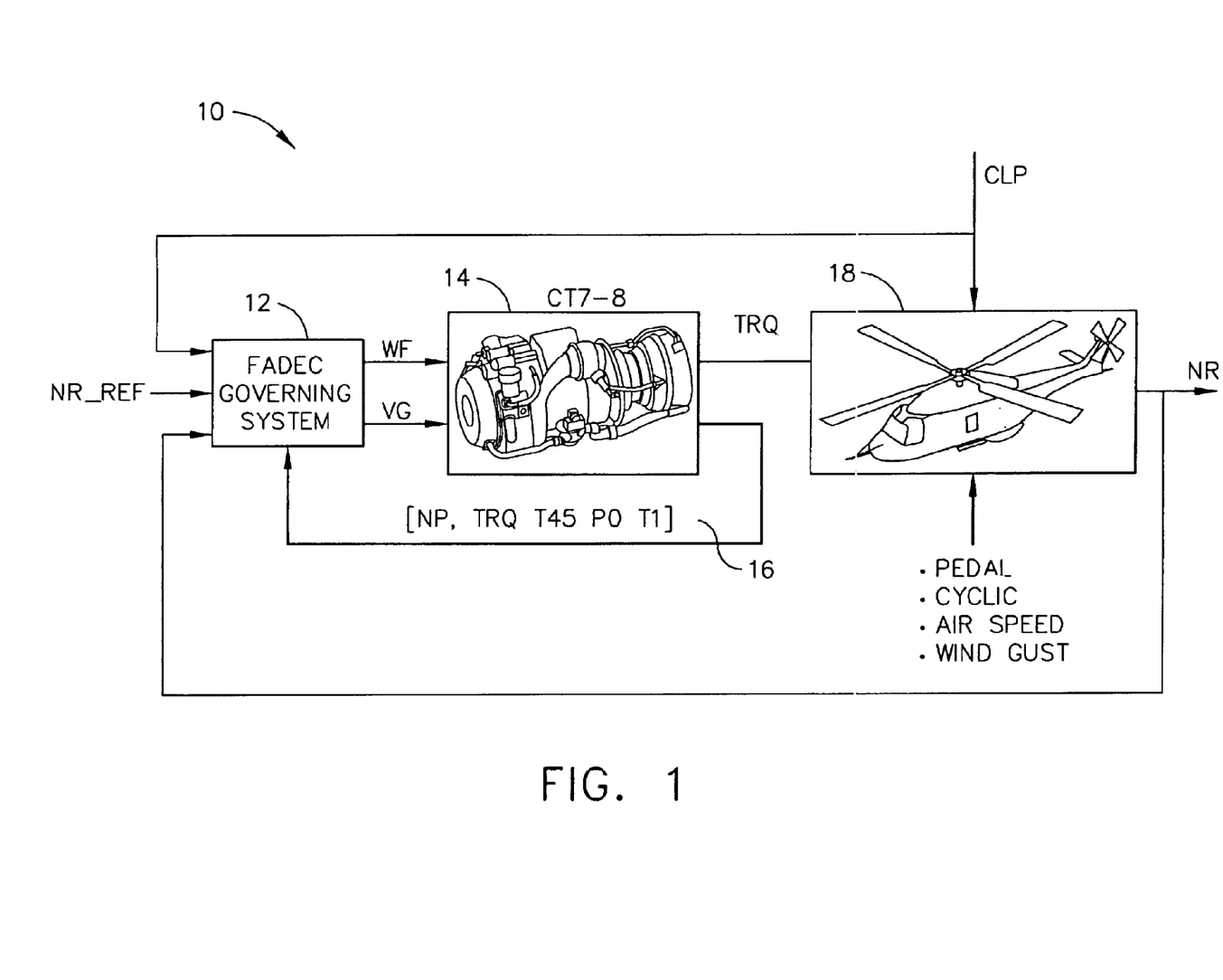
FIG. 1 is a schematic illustration of a known overall helicopter engine control including a Full Authority Digital Engine Control.

Gas turbine engines typically include a governing sub-system that maintains the gas turbine engine at a pre-determined operational speed. For example, in a helicopter including a main rotor, the governing sub-system facilitates improving handling qualities of the helicopter. More specifically, the governing sub-system attempts to maintain the helicopter main rotor speed, NR, at a reference value, NR_REF, despite being subjected to external disturbances such as actions from pedal and cyclic, air speeds, and wind gust. FIG. 1 illustrates the overall helicopter engine control with a Full Authority Digital Engine Control (FADEC). The helicopter can change the load in the rotor system by collective pitch (CLP), cyclic, and pedals. When load is increased the rotor speed decreases, the governing system in FADEC can react to the changes in the main rotor speed, NR based on measured engine parameters and rotor speed and increase fuel flow (WF).

To improve operational handling qualities, feed forward anticipation signals may be used by the governing system to anticipate and correct for transients. If feed forward anticipation signals are not active for some maneuvers, the main rotor speed is maintained by an isochronous gas turbine Np governor, and the helicopter system responsiveness and disturbance rejection capability are reliant upon only the governor dynamics within the governing sub-system.

Known governing sub-systems use relatively simple lead-lag compensation to attenuate the main rotor response to facilitate a stable system. In addition, notch filters, centered at main rotor resonance, are often included to permit higher system frequency crossover and improved phase margin for the governing sub-system. However, these methods do not directly address system disturbance rejection capability. Furthermore, the simple structure of the governor dynamics may yield a low bandwidth system, thus limiting an overall system performance.

BRIEF SUMMARY OF THE INVENTION

In one aspect of the invention, a method for estimating gas turbine engine governor dynamics within a system is provided. The gas turbine engine includes a plurality of sensors responsive to engine operations. The method comprises identifying a first set of parameters utilized in the governing system, identifying a second set of parameters utilized in the governing system, and generating governor dynamics estimates utilizing the first and second sets of parameters to solve multiple objective optimization algorithms.

In another aspect, an apparatus for estimating governor dynamics for a gas turbine engine used in a system is provided. The apparatus is programmed to obtain a first set of parameters from a governing sub-system coupled to the system, obtain a second set of parameters from the governing sub-system, and generate governor dynamics estimates utilizing the first and second sets of parameters to solve multiple objective optimization algorithms.

In a further aspect of the invention, a governor dynamics estimation process for a system including a gas turbine engine is provided. A governor is coupled to the engine, and the design process utilizes a processor. The processor is configured to receive a first set of parameter outputs indicative of system responsiveness, receive a second set of parameter outputs indicative of system stability robustness, and generate governor estimates utilizing the first and second sets of parameters to solve multiple objective optimization algorithms.

DETAILED DESCRIPTION OF THE INVENTION

FIG. 1 is a schematic illustration of a known helicopter engine control 10 including a Full Authority Digital Engine Control (FADEC) 12 and for use with a gas turbine engine 14, such as a CT7-8, commercially available from General Electric Aircraft Engines, Lynn, Mass. FADEC 12 receives a plurality of measured engine parameters 16, relating to, but not limited to, temperatures T45, T1, operating rotational speeds such as turbine speed NP, shaft torque TRQ, and operating pressures PO. FADEC 12 facilitates improving handling qualities of a helicopter 18. More specifically, engine control 10 attempts to maintain the helicopter main rotor speed, NR, at a reference value, NR_REF, despite being subjected to external disturbances including, but not limited to such as actions from pedal and cyclic, air speeds, and wind gust. Additionally, helicopter 18 can change the load in the rotor system by collective CLP, cyclic, and pedals. When load is increased, the rotor speed decreases, engine control 10 and FADEC 12 react to the changes in main rotor speed, NR based on measured engine parameters 16 to adjust rotor speed by fuel flow WF.

Figure 2:
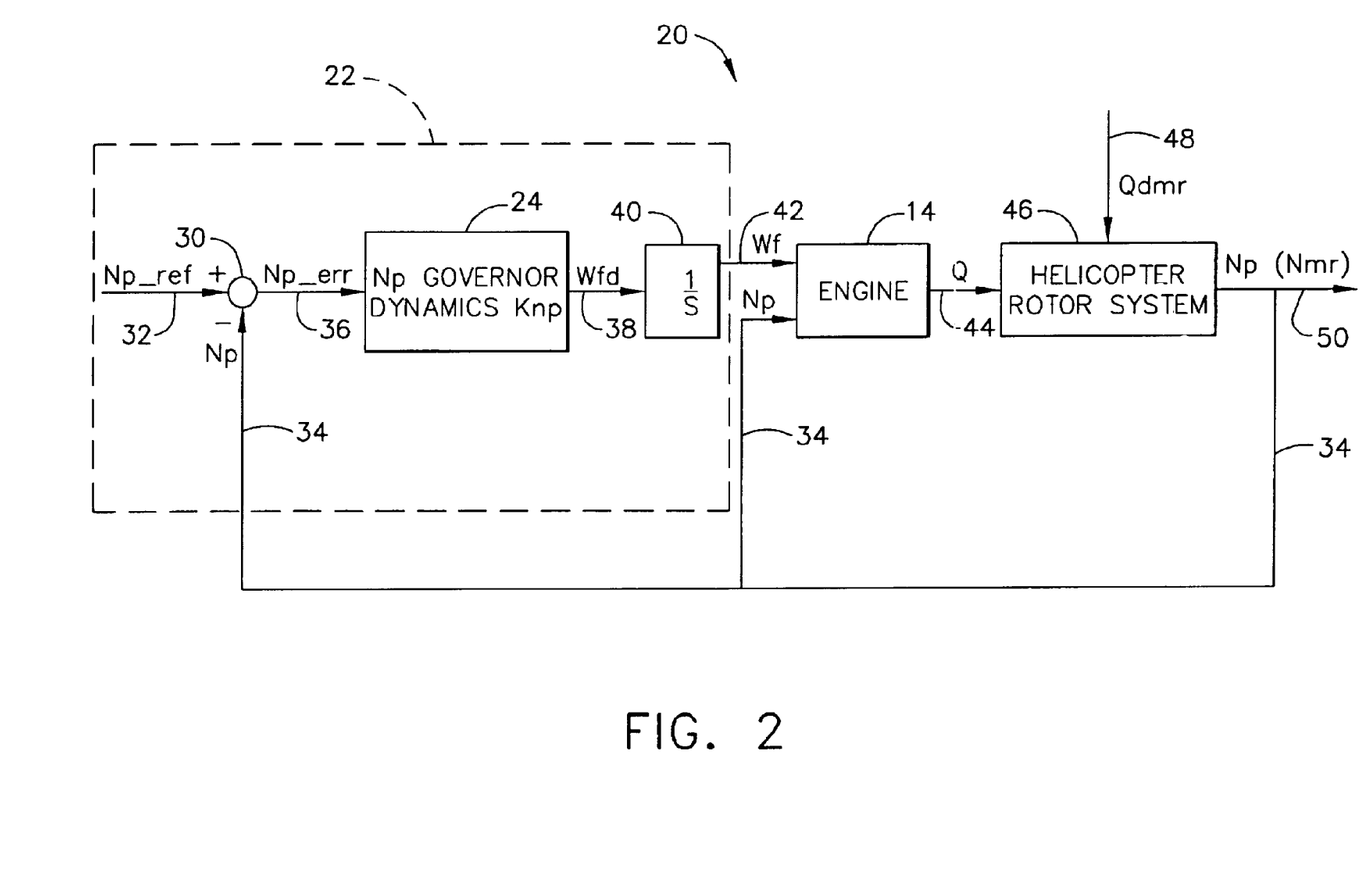
FIG. 2 is a block diagram of a known general governing system for a gas turbine engine.

FIG. 2 is a block diagram 20 of an engine control system 21 including a general governing system 22 for use with a gas turbine engine 14. More specifically, governing system 22 is used to facilitate a helicopter main rotor (not shown) being maintained at a reference speed. Governing system 22 is implemented in a processor-based engine control system. The term processor, as used herein, refers to microprocessors, application specific integrated circuits (ASIC), logic circuits, and any other circuit or processor capable of executing governing system 22 as described herein. In one embodiment, gas turbine engine 14 is a T700 engine commercially available from General Electric Aircraft Engines, Lynn, Mass., and governing system 22 is coupled to an engine control system known as a full authority digital electronic control (FADEC) available from General Electric Aircraft Engines, Lynn, Mass.

Governing system 22 includes an NP governor 24 which is used to maintain rotor speed through governor dynamics Knp. In the exemplary embodiment, the governor is an isochronous gas turbine Np governor used to maintain rotor speed. Governing system 22 also includes a comparator 30 that receives a first signal 32 and a second signal 34. First signal 32 represents a power turbine reference speed Np_ref in rpm, and second signal 34 represents a power turbine actual speed Np in rpm. Comparator 30 compares signals 32 and 34 and transmits a signal 36 to governor 24 that represents a difference Np_err, between first signal 32 and second signal 34 in rpm.

Governor system 22 receives signal 34 and determines a fuel flow rate Wfd in pph/sec for engine 14 to operate the main rotor at the desired reference speed. A signal 38 representing fuel flow rate Wfd is then transmitted to an integrator 40 which integrates signal 38 and transmits a signal 42 to engine components (not shown), which respond to supply a desired fuel flow Wf in pph to engine 14.

Engine 14 receives fuel at desired fuel flow Wf to operate at a power level to produce power turbine actual speed Np. More specifically, engine 14 operates in response to fuel flow Wf supplied to engine 14 to generate an amount of torque Q 44 supplied to helicopter rotor system 46.

Helicopter rotor system 46 operates in response to torque Q generated by engine 14. Operation of helicopter rotor system is also affected by torque disturbances Qdmr 48 induced to the main rotor and measured in ft-lbs., and other external disturbances. Sensors detect a power turbine (helicopter main rotor) speed Np (Nmr) and transmit a signal 50 representing the main rotor speed Np (Nmr) to the helicopter control system. An additional signal 34 representing a power turbine actual speed Np Is transmitted to comparator 30. Based on speed error signal Np_err 36, Np governor 24 attenuates the main rotor response and other external disturbance to maintain desired or reference speed Np_ref 32.

Figure 3:
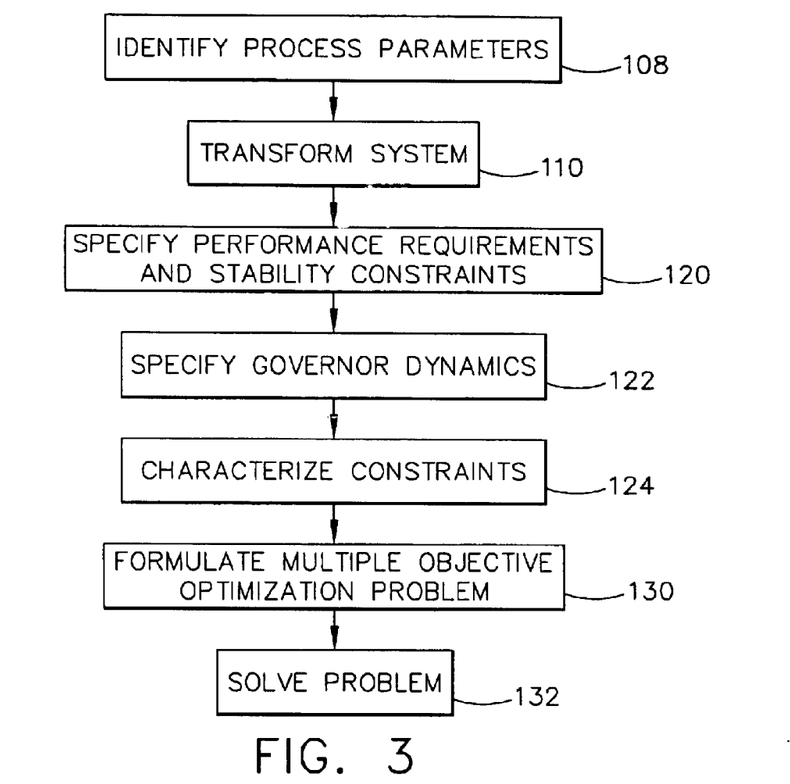
FIG. 3 is a flow diagram of a process of estimating governor dynamics for a gas turbine engine.
Figure 4:
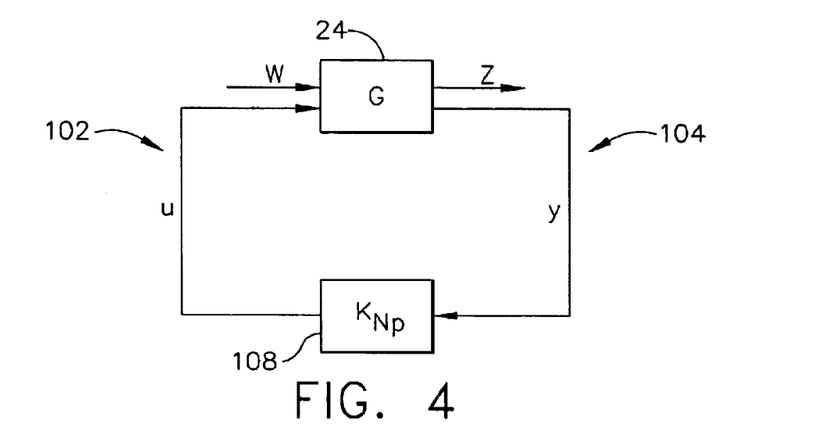
FIG. 4 is a block diagram of a general feedback system framework used with the process shown in FIG. 3.

FIG. 3 is a flow diagram illustrating a process used to estimate governor dynamics Knp for a gas turbine engine governor (not shown) installed within a helicopter (not shown). FIG. 4 is a block diagram 102 illustrating a general feedback system framework 104. A first step of the process used in estimating governor dynamics Knp is to identify 108 the system input signals and output signals of governing system 22 (shown in FIG. 2) for gas turbine engine 14 (shown in FIG. 2). After the governing system parameters are identified 108, governing system 22 is transformed 110 into general feedback system framework 104.

Specifically, commands u, measurements y, regulated signals z, and disturbances w, are identified 108 within governing system 22. In the exemplary embodiment, signal u represents a fuel flow rate Wfd measured in pph/sec, and signal y represents a difference between a power turbine reference speed Np_ref, measured in rpm, and a power turbine actual speed Np, measured in rpm. Furthermore, regulated signal z represents power turbine speed Np, measured in rpm, and disturbances w include power turbine reference speed Np_ref, measured in rpm, and torque disturbances Qmdr induced to the helicopter main rotor and measured in ft-lbs. General feedback system framework 108 uses either open-loop or closed-loop operations to obtain transfer functions and time responses as functions of governor dynamics Knp.

The process used in estimating governor dynamics Knp then specifies 120 system performance requirements and stability robustness constraints, specifies 122 a structure of governor dynamics Knp, and characterizes 124 constraints of governor dynamics Knp. Specifically, system performance requirements are characterized 124 by the open loop transfer functions, closed-loop transfer functions, time responses, or other dynamic restraints. For example, the main rotor torque disturbance rejection level is characterized 124 by a closed-loop transfer function, or its step response, from Qdmr to Np, and the system bandwidth is specified by the closed-loop transfer function from Np ref to Np_.

Stability constraints are characterized 124 by open-loop transfer functions. For example, the open-loop transfer function from Np_err to Np describes system gain margin and phase margin constraints. Furthermore, governor dynamics, Knp, are characterized 124 with a series of general second-order systems. More specifically, the governor dynamics can be specified 122 such that governor constraints are characterized 124 by natural frequencies and damping factors.

A multiple objective optimization problem for the governor dynamics Knp is then formulated 130 and solved 132. Specifically, the optimization problem, as a function of the governor dynamics Knp, is formulated 130 based on the performance requirements, stability constraints, governor structure selection, and governor structure. Then multiple objective optimization algorithms are used to solve 132 the problem, and governor dynamics Knp are obtained.

One advantage of this invention is that the method facilitates obtaining stabilizing governor dynamics for multiple plants with different characteristics. For example, this method can be used to obtain a governor that can ensure the stability of helicopter engine control system during the transition from a coupled plant to a decoupled plant or vice-versa. A coupled plant refers to the plant when the helicopter rotor is clutched to the engine. A decoupled plant refers to the plant when the helicopter rotor is declutched from the engine, such as during autorotation maneuvers. The dynamics of these two plants have totally different characteristics.

In an exemplary embodiment, a normalized linear model for a specific turboshaft engine and a specific helicopter rotor system and other important dynamics is identified 108 and transformed 110 into general feedback system by $$w=[Np_{13}\text{ ref Qdmr}], u=Wfd, z=Np, \text{ and } y=Np_{13} \text{ ref}-Np.$$

defining:

Step 1: Select the structure of the governing dynamics Np.

Step 2: Specify the system performance requirements and stability constraints.

Step 3: Solve the multiple objective optimization problem for the governor dynamics Knp.

From FIGS. 2 and 4, the set of achievable stable closed loop $$\{G_{cl}(K_{np}) = G_{zw} + G_{zu}K_{np}(I - G_{yu}K_{np})^{-1}G_{yw} | \text{stabilizing } K_{np}\}$$

transfer functions is given by the following:

For example, the Np governor structure may be chosen as a fourth general $2^{nd}$-order $$Knp(s) = gn * \prod_{i=1}^{4} \left\{ \frac{\left(\frac{s}{wn_i}\right)^2 + 2 * \frac{zn_i}{wn_i} + 1}{\left(\frac{s}{wd_i}\right)^2 + 2 * \frac{zd_i}{wd_i}s + 1} \right\}$$

system in series as:

Wherein, gn represents the governor gain, wn and wd are natural frequencies, and zd and zn are damping factors. Those parameters will be obtained by solving the optimization problem. The optimization problem then can be defined by the performance, stability requirements, and constraints on governor dynamics Knp itself. Performance and disturbance rejection capability may be characterized using the above-defined set of the closed loop transfer functions, or through a closed loop step or ramp response in time domain. The stability margins may be characterized by the open loop transfer functions. For example, the stability margins may be characterized by the open loop transfer function from Np_err to Np. The governor natural frequencies and damping factors can also be formulated as constraints. For example, a multiple objective governor design may be formulated from open loop transfer functions, closed loop transfer functions, or directly from governor structure:

open loop gain margin>6.0 dB
open loop phase margin>50.0 deg
open loop gain at main rotor frequency<−9.0 dB
open loop gain at tail rotor frequency<−9.0 dB
governor damping factor zd>0.60

The optimization objective function is chosen to maximize the load disturbance rejection capability, which may be formulated to minimize the step response of the closed loop transfer function from main rotor torque Qdmr to Np.

Figure 5:
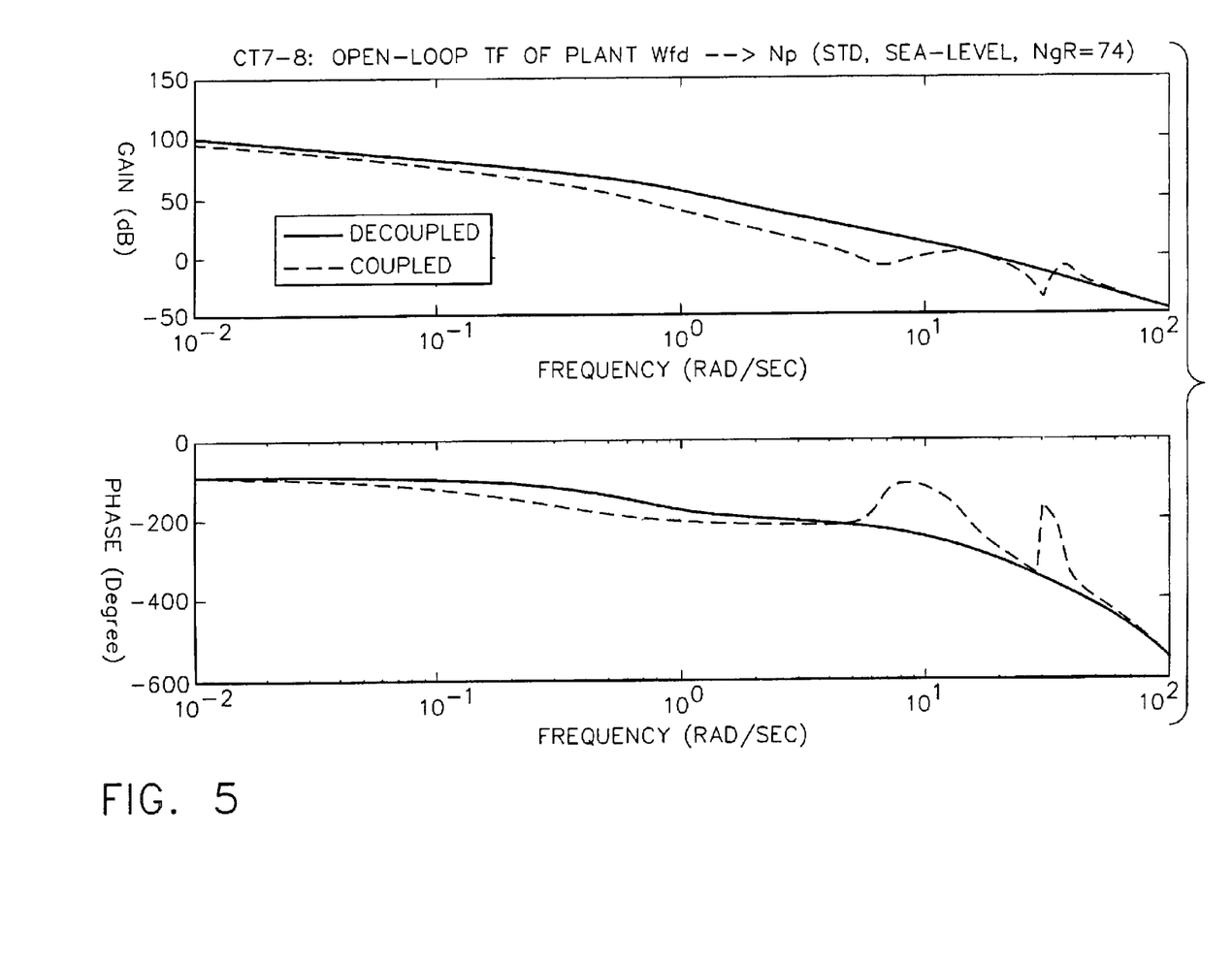
FIG. 5 is an exemplary Bode plot illustrating open loop dynamics for coupled and uncoupled plants.
Figure 6:
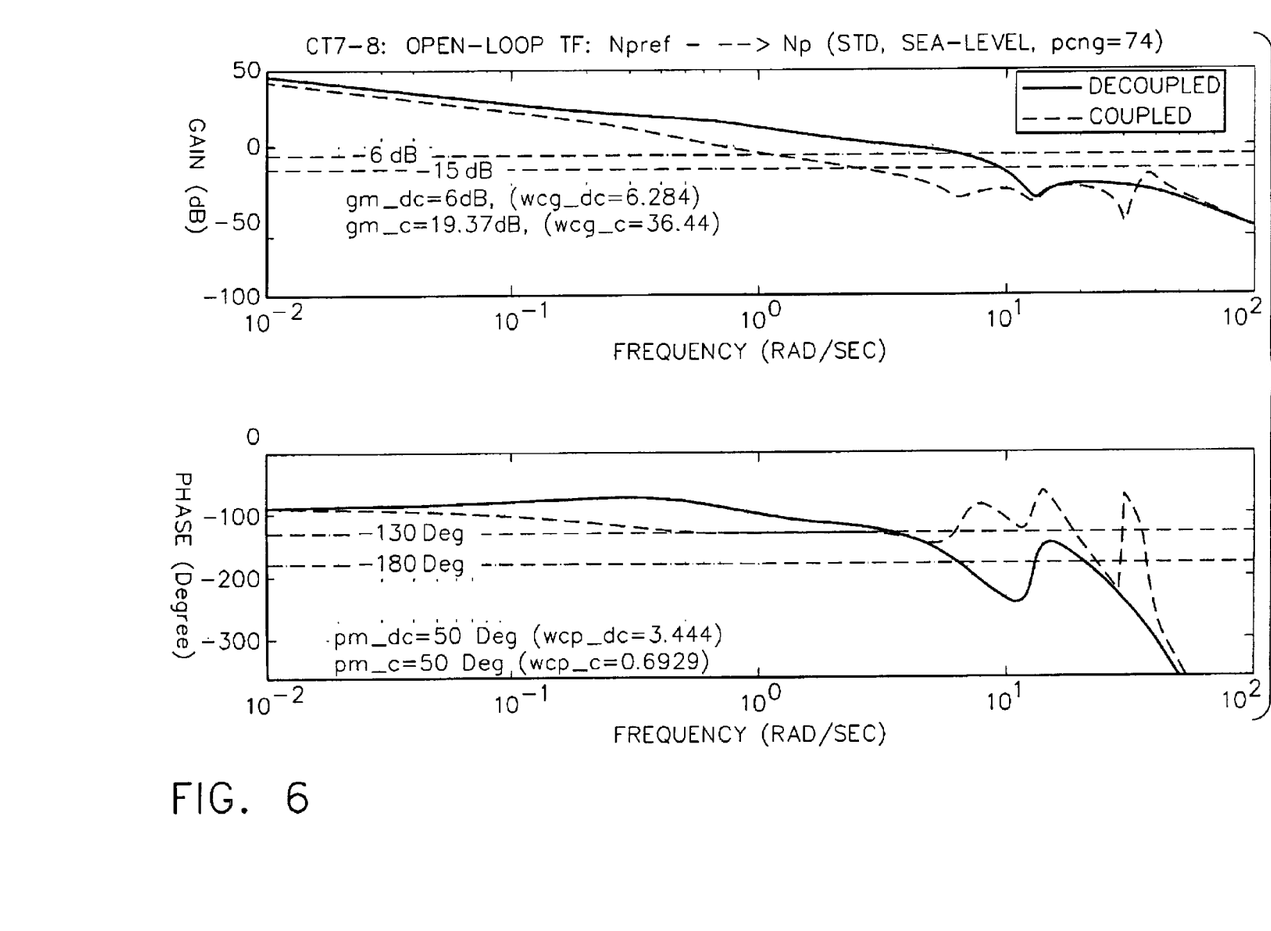
FIG. 6 is an exemplary Bode plot illustrating open loop transfer functions for coupled and uncoupled plants.

FIG. 5 is an exemplary Bode plot illustrating open loop dynamics for coupled and uncoupled plants. FIG. 6 is an exemplary Bode plot illustrating open loop transfer functions for coupled and uncoupled plants. To further illustrate the design method, consider an exemplary governor design problem for a helicopter rotor and engine transitioning between coupling and decoupling situations. The two drastically different open loop dynamics from Np_err to Np, the coupled plant and the decoupled plant, are illustrated in FIG. 5.

The governor design problem is formulated as the following multiple objective optimization problem:

Max: Bandwidth of open loop transfer function from Np_ref to Np for both Coupled and decoupled systems Subject to:
open loop gain margins>6.0 dB for both coupled and decoupled plants
open loop phase margin>50.0 deg for both coupled and decoupled plants
open loop gain at main rotor frequency<−15.0 dB for the coupled plant
open loop gain at tail rotor frequency<−15.0 dB for the coupled plant
governor damping factor zd>0.60

After solving this optimization problem with any available optimization solver, the governor dynamics Knp can be obtained. The resulting open loop transfer functions are illustrated in FIG. 6.

The above described process for estimating Np governor dynamics utilizes both the system responsiveness and the system stability robustness in determining the governor dynamics. As a result, the process facilitates generating a more accurate definition of the governor dynamics than other known design processes. Furthermore, because the process characterizes system responsiveness and the system stability robustness in open loop and closed-loop transfer functions in frequency-domain and in time-domain, the estimate process is applicable with substantially all flight conditions. In addition, because multiple optimization algorithms are solvable, the process is applicable to a plurality of governor designs or servo-loop designs. As a result, the design process accounts for system performance and robustness to provide governor dynamics estimates that facilitate improved governor design.

While the invention has been described in terms of various specific embodiments, those skilled in the art will recognize that the invention can be practiced with modification within the spirit and scope of the claims.

What is claimed is:

1. A method for estimating governor dynamics within a system, the system having a plurality of sensors responsive to engine operations, said method comprising
identifying a first set of parameters utilized in the governing system, relating to the system responsiveness;
identifying a second set of parameters utilized in the governing system, relating to the system stability robustness; and
generating governor dynamics estimates by utilizing the first and second sets of parameters to solve multiple objective optimization algorithms.

2. A method in accordance with claim 1 wherein said obtaining identifying a first set of parameters further comprises obtaining a set of outputs representative of system responsiveness, wherein the first set of parameters is chosen from at least one of a command, a measurement, a regulated signal, and a disturbance.

3. A method in accordance with claim 1 wherein said identifying a second set of parameters further comprises obtaining a set of outputs representative of system stability robustness, wherein the second set of parameters is chosen from at least one of a command, a measurement, a regulated signal, and a disturbance.

4. A method in accordance with claim 1 wherein said generating governor dynamics further comprises characterizing system responsiveness and stability robustness with open-loop and closed-loop transfer functions in frequency domain.

5. A method in accordance with claim 1 wherein said generating governor dynamics further comprises characterizing system responsiveness and stability robustness with step/ramp time responses in time-domain.

6. Apparatus for estimating governor dynamics for a gas turbine engine used in a system, said apparatus programmed to:

obtain a first set of parameters from a governing subsystem coupled to the system, relating to at least one of system responsiveness and system stability robustness;

obtain a second set of parameters from the governing sub-system coupled to the system, relating to at least one of system responsiveness and system stability robustness; and generate governor dynamics estimates utilizing the first and second sets of parameters obtained to solve multiple objective optimization algorithms.

7. Apparatus in accordance with claim 6 wherein said processor further programmed to characterize at least one of system responsiveness and system stability robustness using open-loop and closed-loop functions in frequency domain, and step/ramp time responses in time-domain.

8. Apparatus in accordance with claim 6 wherein said first and second set of parameters are chosen from at least one of a command, a measurement, a regulated signal, and a disturbance in the system.

9. A governor dynamics estimation process for a system including a gas turbine engine, a governor coupled to the engine, said governor dynamics estimation process utilizing a processor configured to:

receive a first set of parameter outputs indicative of system responsiveness;

receive a second set of parameter outputs indicative of system stability robustness; and generate governor estimates by utilizing the first and second sets of parameter outputs to solve a multiple objective optimization algorithm problem.

10. A governor dynamics estimation process in accordance with claim 9 wherein said processor further configured to solve a plurality of optimization algorithms to generate governor estimates.

11. A governor dynamics estimation process in accordance with claim 9 wherein said processor further configured to execute a general feedback system to generate governor estimates.

12. A governor dynamics estimation process in accordance with claim 9 wherein said first and second set of parameter outputs are chosen from at least one of a command, a measurement, a regulated signal, and a disturbance within the system.

13. A governor dynamics estimation process in accordance with claim 9 wherein said processor further configured to characterize at least one of system responsiveness and system stability robustness using open-loop and closed-loop functions in frequency domain, and step/ramp time responses in time-domain.

* * * * *

UNITED STATES PATENT AND TRADEMARK OFFICE
CERTIFICATE OF CORRECTION

PATENT NO. : 6,789,390 B2
DATED : September 14, 2004
INVENTOR(S) : Hu et al.

It is certified that error appears in the above-identified patent and that said Letters Patent is hereby corrected as shown below:

Column 6,
Line 43, delete "obtaining identifying" and insert therefor -- identifying --.

Signed and Sealed this

Twenty-third Day of August, 2005

JON W. DUDAS
*Director of the United States Patent and Trademark Office*